Oct. 22, 1929.  M. J. KNIPFING  1,732,972
SOD CUTTER
Filed June 17, 1927  2 Sheets-Sheet 2
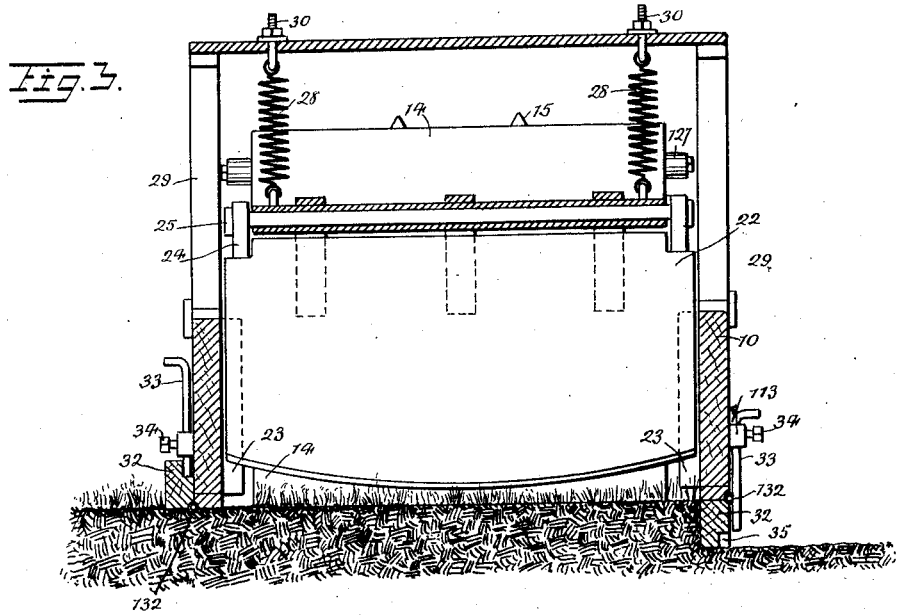
INVENTOR
M. J. Knipfing
BY
ATTORNEYS
WITNESSES Patented Oct. 22, 1929

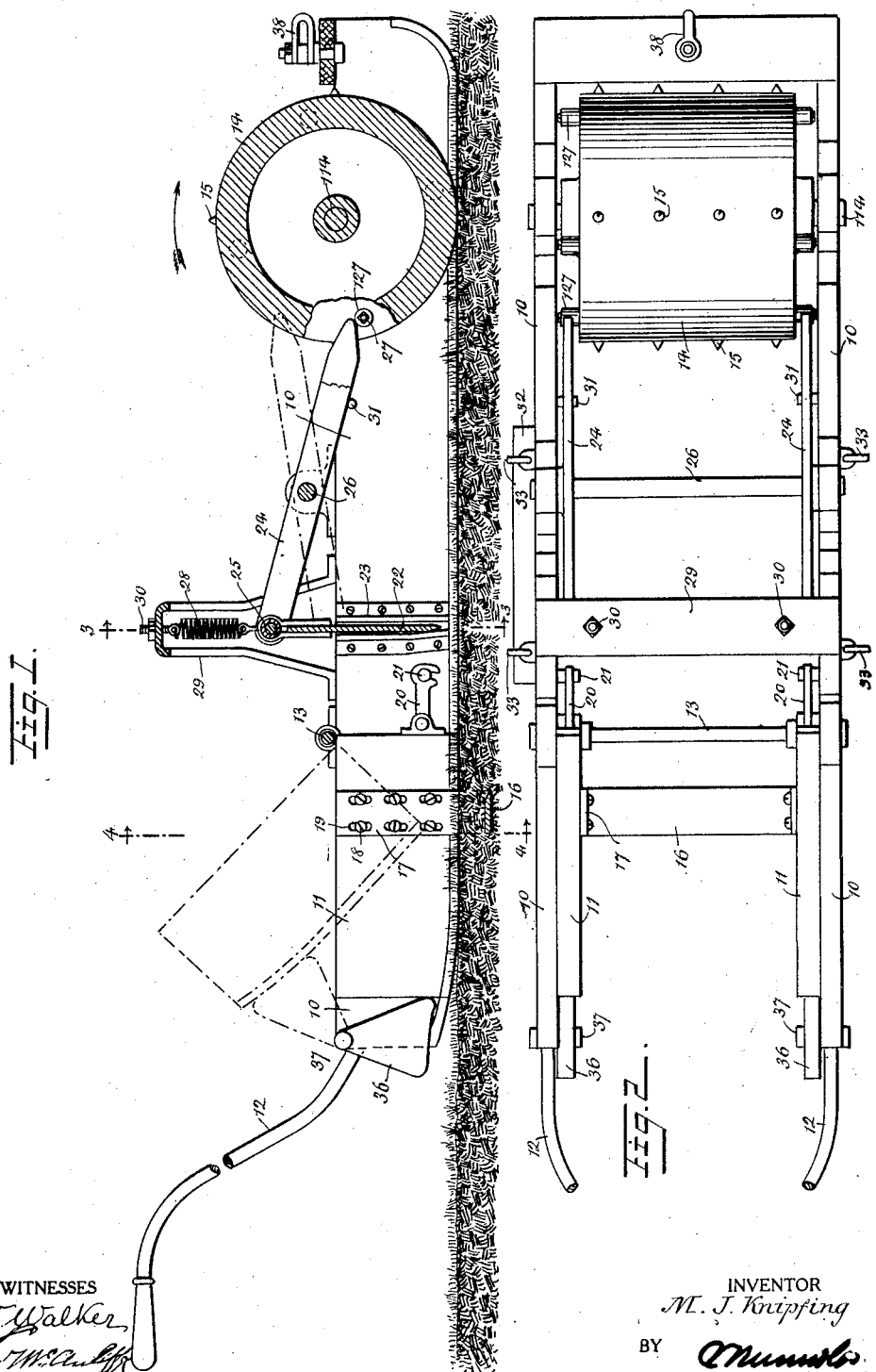

1,732,972

UNITED STATES PATENT OFFICE

MICHAEL JOHN KNIPFING, OF WESTBURY, NEW YORK

SOD CUTTER

Application filed June 17, 1927. Serial No. 199,554.

My invention relates to a machine adapted to be drawn over sodded ground and having means thereon to cut the sides of the sod and beneath the same as well as a knife to sever the sods in given lengths.

The object of my invention is to provide a novel and practical machine for the indicated purpose, efficient in making the various cuts in the sod.

A further object is to provide for holding out of contact with the ground the slicing knife in hauling the machine from place to place.

The manner and means whereby the above and other objects are attained will clearly appear as the description proceeds.

Reference is to be had to the accompanying drawings forming a part of this specification, it being understood that the drawings are merely illustrative of one example of the invention.

Figure 1 is a longitudinal vertical section of a machine embodying my invention, parts being broken away and in section.

Figure 2 is a plan view thereof.

Figure 3 is a transverse vertical section on the line 3—3 of Figure 1.

Figure 4 is a transverse vertical section on the line 4—4 of Figure 1.

Figure 5 is a detail in vertical section indicating the movement of the knife for severing the sod.

Figure 6 is a fragmentary view of an end of the ground roller, the trip roller being shown in section.

Figure 7 is a detail in horizontal section, as indicated by the line 7—7 in Figure 4.

In carrying out my invention in accordance with the illustrated example, a main frame 10 is provided presenting sides adapted to run on the sodded ground, and an auxiliary frame 11 disposed in the rear of the frame 10 and provided with handle bars 12 at the side, said auxiliary frame being pivoted to the frame 10 at the top, as by a transverse pivot shaft 13. A ground roller 14 is provided on the main frame, mounted on an axle 114, and is provided with spurs or other suitable traction members 15.

On the frame 11 is a cutter generally U-shaped, presenting a slicing member 16 disposed horizontally sufficiently below the frame 11 to cut a sod of the desired thickness, the sides 17 of said cutter extending vertically, and adjustably secured to the sides of the frame 11 are slot and pin connections, there being shown screws 18 passing through said sides 17 and through slots 19 in the cutter. The hinged frame 11 is suitably held in its lower position, there being hook shaped latches 20 shown engaging lateral pins 21 on the sides of frame 10.

A chopping or severing knife 22 is provided for cutting the sods in given lengths, said knife 22 moving between vertical guide members 23 on frame 10. Operating levers 24 for the knife 22 are pivotally connected with knife 22 at the upper edge, as at 25, said levers being fulcrumed between their legs on a shaft 26. On the traction wheel or ground wheel 14 are provided trip members to successively engage levers 24 and rock the same for vertically reciprocating the knife 22. The trips 27 are shown in the form of screw bolts having friction rollers 127 thereon. The trips 27 are provided at suitable intervals about the ends of roller 14, and the number of said rollers and also the size of the wheel 14 can be employed to determine the length of sod severed by the knife 22 by varying the periodicity of operation of said knife. The diameter of the roller 127 may be varied to vary the depth of the vertical cut made by knife 22.

Springs 28 are employed to lift the knife 22 after each depression of the knife by levers 24, said springs being secured to said knife at the top and also held to the top of an arched frame 29 by eye bolts 30. Stop pins 31 project laterally inward from the sides of frame 10 to arrest the downward movement of the forward ends of the levers in response to the reaction of the springs 28.

As shown best at the bottom of Figure 2, guide boards 32 are provided at the lower edge of the sides of frame 10 and hinged thereto as at 132. Each board 32 may be swung to a position as shown at the right of Figure 3, directly beneath the sides of frame 10, or swung upwardly on its hinge 132 to the ground level, as indicated at the left of Figure 3. When swung to the lower position shown at the right of Figure 3, a guide board 32 runs along the land side produced by previously cut sods, after the manner of a landside of a plow, to guide the machine in a straight direction, in proper relation to the sodded surface to be cut. In the lowered position of a guide board 32 it is held against displacement by restraining pins 33 vertically disposed on the sides of the frame 10 and held in the adjusted position by set screws 34, or the like, passing through guide keepers 113 on which the pins 33 are adjustable. In each guide board 32 is a notch 35 which receives the lower end of the pin 33 as a lock for holding the said board in raised position.

I provide suitable means to hold the hinged frame 11 when swung upwardly to the dotted line position indicated in Figure 1 so as to sustain the slicing knife 16 and lower ends of the side knives 17 out of contact with the ground in moving the machine from place to place. Said means to hold the frame 11 is shown as consisting of swingable blocks or chocks 36 pivoted as at 37 at the sides of frame 10. The machine is intended to be drawn over a field behind an automobile or tractor, for which purpose I have shown a clevis 38 on the machine at the front.

I would state furthermore that while the illustrated example constitutes a practical embodiment of my invention, I do not limit myself strictly to the exact details herein illustrated, since, manifestly, the same can be considerably varied, without departure from the spirit of the invention as defined in the appended claims.

I claim:

1. A machine of the class described, including a frame, a ground wheel mounted in said frame, a reciprocating knife having guided vertical movement in the frame, levers pivotally connected at one end with said knife, and trips on the wheel at intervals to operate said levers for reciprocating the knife, together with spring means to lift said knife and levers after each downward movement of the knife.

2. In a sod cutting machine, a portable frame, a ground engaging roller extending transversely thereof and having trips projecting laterally from its ends, a reciprocating knife vertically movable in the frame to one side of the ground engaging roller, parallel levers pivotally supported intermediate their ends between the roller and knife, one end of each of the levers being pivotally connected with the knife at one end of the latter while the opposite ends of the levers are disposed in the path of movement of the trips and engageable by the latter to rock the arms in a direction to move the knife in a downward direction, a bracket supported on the frame and overlying the knife, and contractile springs connected with the brackets and knife and normally urging the latter in upward direction.

MICHAEL JOHN KNIPFING.